(12) United States Patent
Kumar et al.

(10) Patent No.: US 10,884,857 B2
(45) Date of Patent: Jan. 5, 2021

(54) DATA STORAGE DEVICE AND METHOD OF OPERATING

(71) Applicant: SAMSUNG ELECTRONICS CO., LTD., Suwon-si (KR)

(72) Inventors: Satish Kumar, Suwon-si (KR); Ju Pyung Lee, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 63 days.

(21) Appl. No.: 16/124,227

(22) Filed: Sep. 7, 2018

(65) Prior Publication Data

US 2019/0272216 A1 Sep. 5, 2019

(30) Foreign Application Priority Data

Mar. 5, 2018 (KR) .......................... 10-2018-0025890

(51) Int. Cl.
*G06F 11/00* (2006.01)
*G06F 11/10* (2006.01)
*G06F 3/06* (2006.01)

(52) U.S. Cl.
CPC ........ *G06F 11/1076* (2013.01); *G06F 3/0619* (2013.01); *G06F 3/0658* (2013.01); *G06F 3/0659* (2013.01); *G06F 3/0685* (2013.01)

(58) Field of Classification Search
CPC .. G06F 11/1076; G06F 3/0619; G06F 3/0685; G06F 3/0659; G06F 3/0658; G06F 11/108; G06F 11/1008; G06F 11/1068; G06F 11/1044; G11C 7/1006; G11B 20/1833

USPC ......................................... 714/763, 766, 770
See application file for complete search history.

(56) References Cited

U.S. PATENT DOCUMENTS

| 8,316,260 | B1 | 11/2012 | Bonwick |
| 9,075,710 | B2 | 7/2015 | Talagala et al. |
| 9,087,220 | B2* | 7/2015 | Chang ..................... G06F 21/79 |
| 9,256,549 | B2 | 2/2016 | Kimmel et al. |
| 9,454,434 | B2 | 9/2016 | Sundaram et al. |
| 9,606,870 | B1 | 3/2017 | Meiri et al. |
| 2012/0233406 | A1* | 9/2012 | Igashira .............. G06F 12/0866 711/118 |
| 2013/0179659 | A1* | 7/2013 | Seo ..................... G06F 12/0246 711/170 |
| 2013/0275656 | A1* | 10/2013 | Talagala .............. G06F 12/0246 711/103 |
| 2015/0277794 | A1* | 10/2015 | Tudor ................... G06F 3/0619 711/103 |

(Continued)

*Primary Examiner* — Albert Decady
*Assistant Examiner* — Osman M Alshack
(74) *Attorney, Agent, or Firm* — Volentine, Whitt & Francos, PLLC

(57) ABSTRACT

A storage device includes multiple memory devices and a memory controller. The memory controller receives, from a host, values corresponding to data stored in the memory devices and keys for identifying the values, generates parities for inspecting the data for any errors based on the values, and manages key-value mapping information regarding a correspondence between the values and the keys. The memory devices include a first memory device and a second memory device, which store the values and the keys, and a third memory device, which stores parity values calculated from the values and a parity value header for managing the parity values.

20 Claims, 13 Drawing Sheets

(56) References Cited

U.S. PATENT DOCUMENTS

| | | | |
|---|---|---|---|
| 2016/0196216 A1* | 7/2016 | Lee | G06F 3/0689 |
| | | | 711/170 |
| 2016/0246537 A1* | 8/2016 | Kim | G06F 3/0619 |
| 2016/0248583 A1* | 8/2016 | McClanahan | G06F 21/78 |
| 2016/0335288 A1 | 11/2016 | Qiu et al. | |
| 2017/0255508 A1 | 9/2017 | Lee et al. | |

* cited by examiner

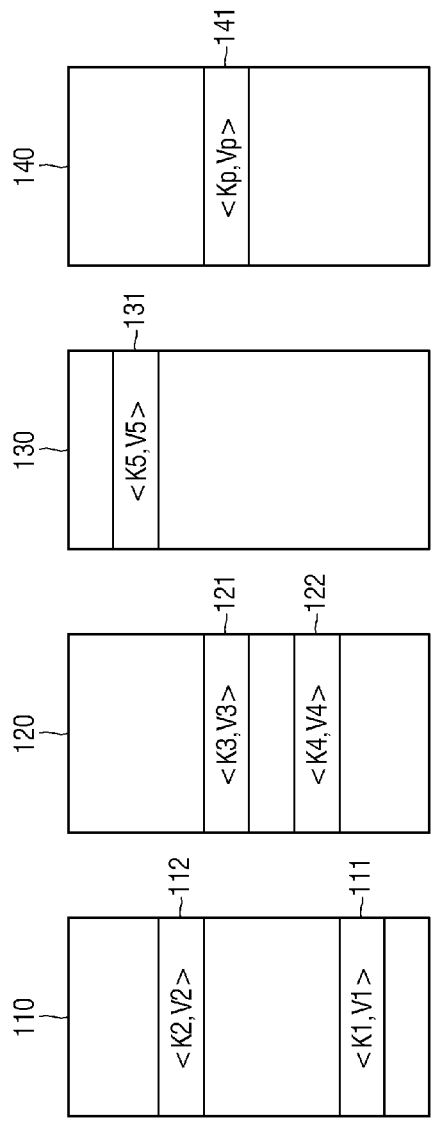

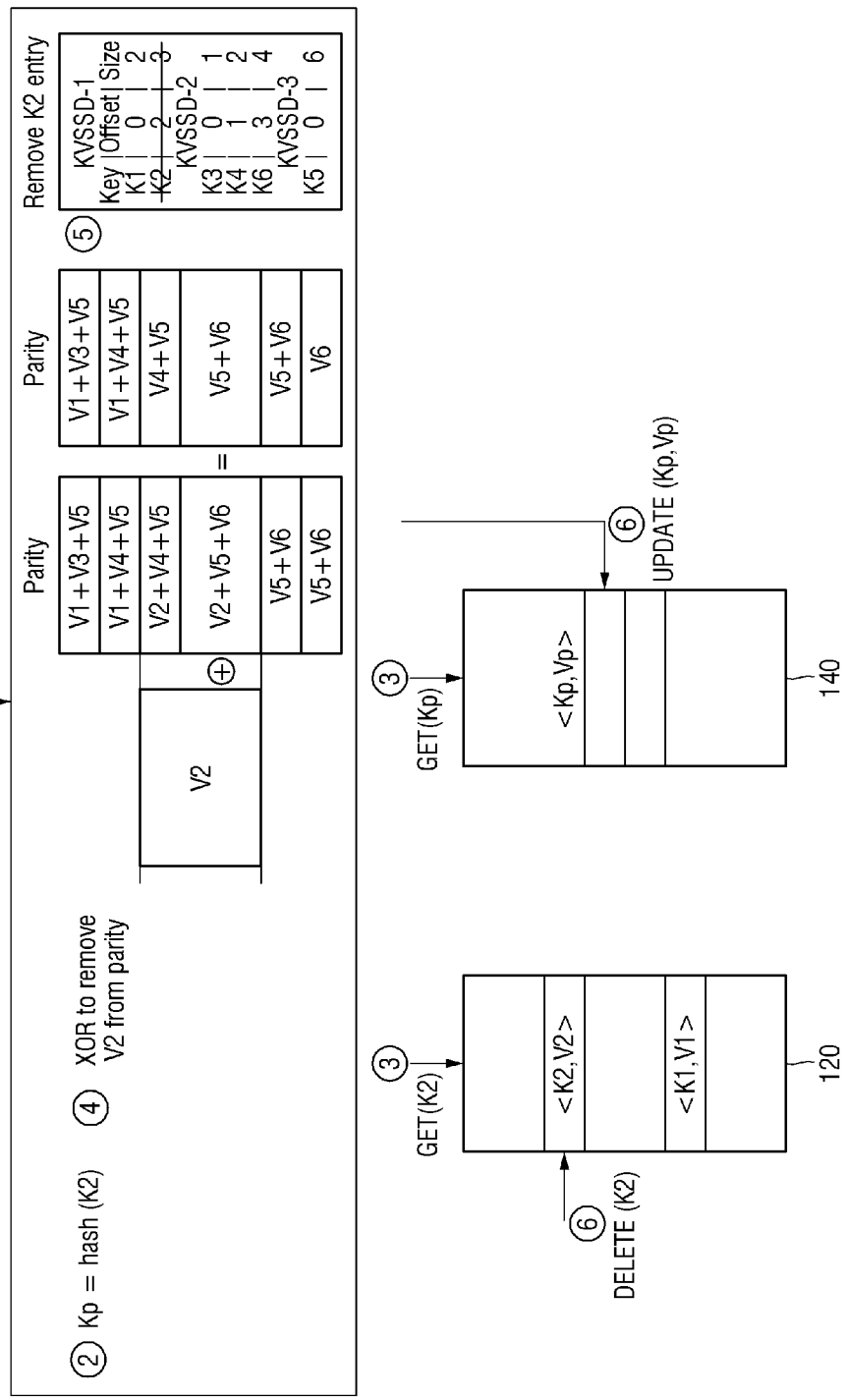

DATA STORAGE DEVICE AND METHOD OF OPERATING

This application claims priority under 35 U.S.C. § 119 to Korean Patent Application No. 10-2018-0025890 filed on Mar. 5, 2018, the disclosure of which is incorporated herein by reference in its entirety.

BACKGROUND

1. Field

The present disclosure relates to a data storage device and a Redundant Array of Independent Disks (RAID) system including the same.

2. Description of the Related Art

Generally, semiconductor memory devices are classified into volatile memory devices and nonvolatile memory devices. Volatile memory devices lose their stored data when their power supplies are interrupted, and nonvolatile memory devices retain their stored data even when their power supplies are interrupted. There are NAND flash memories, which are nonvolatile memory devices that have recently been used widely. Examples of a data storage medium consisting of NAND flash memories include Solid State Drives (SSDs), and SSDs can achieve large storage capacity and fast access speed by using NAND flash memories.

SUMMARY

Embodiments of the present disclosure provide an improved data storage device and a Redundant Array of Independent Disks (RAID) system including the same.

However, embodiments of the present disclosure are not restricted to those set forth herein. The above and other embodiments of the present disclosure will become more apparent to one of ordinary skill in the art to which the present disclosure pertains by referencing the detailed description of the present disclosure given below.

According to some embodiments of the present disclosure, a storage device comprises a plurality of memory devices, and a memory controller receiving, from a host, values corresponding to data stored in the plurality of memory devices and keys for identifying the values, generating parities for inspecting the data for any errors based on the values, and managing key-value mapping information regarding a correspondence between the values and the keys, wherein the plurality of memory devices include first and second memory devices, which store the values and the keys, and a third memory device, which stores parity values calculated from the values and a parity value header for managing the parity values.

According to some embodiments of the present disclosure, a Redundant Array of Independent Disks (RAID) system comprises a host providing an access command, values, which correspond to data being targeted by the access command, and keys for identifying the values, and a plurality of storage devices configured as a RAID, receiving the access command from the host, and accessing data stored therein in response to the access command, wherein the plurality of storage devices include first and second storage devices, which store the values and the keys, a third storage device, which stores parity values, calculated from the values stored in the first and second storage devices, and a parity value header for managing the parity values, and a RAID controller, which manages key-value mapping information regarding the correspondence between the values and the keys.

According to some embodiments of the present disclosure, a storage device comprises a plurality of first memory devices storing data and a second memory device storing parities of the data, and a memory controller receiving, from a host, values corresponding to the data stored in the first memory devices and keys for identifying the values, generating parities for inspecting the data for any errors based on the values, and managing key-value mapping information regarding a correspondence between the values and the keys, wherein the memory controller calculates the parities from values mapped to offsets of predetermined addresses in the first memory devices and stores the parities in the second memory device.

BRIEF DESCRIPTION OF THE DRAWINGS

The above and other embodiments and features of the present disclosure will become more apparent by describing in detail embodiments thereof with reference to the attached drawings, in which:

FIG. 4 is a conceptual diagram illustrating data stored in each memory device of the data storage device according to some embodiments of the present disclosure;

FIGS. 8A and 8B are conceptual diagrams illustrating a DELETE operation of the data storage device according to some embodiments of the present disclosure.

DETAILED DESCRIPTION

In the written description that follows, the term "block" is used to generally refer to various software and/or hardware components, including but not limited to Field Programmable Gate Array(s) (FPGA), Application Specific Integrated Circuit(s) (ASIC) and the like. A block may be variously configured, wholly or partially, in addressable storage media and may be further configured for execution by one or more processors or computational platforms. A block may include or be configured from software component(s), object-oriented software component(s), class component(s), and task component(s) as well as process(es), function(s), attribute(s), procedure(s), subroutine(s), program code segment(s), driver(s), firmware, microcode, circuitry, data, database(s), data structure(s), table(s), array(s), and variable(s). The functionality provided by the various components of a block, or among multiple blocks may be rationally combined or separated according to design and system constraints.

Figure 1:
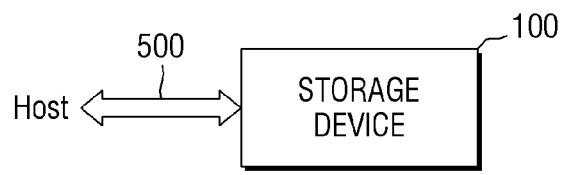
FIG. 1 is a block diagram of a data storage system including a data storage device according to some embodiments of the present disclosure.

FIG. 1 is a block diagram of a data storage system 10 including a data storage device 100 according to some embodiments of the present disclosure, where the data storage device 100 communicates (e.g., transmits and/or receives) data and/or commands with an external host (not shown) via an interface 500. With this configuration, the data storage device 100 may variously receive (e.g.,) SET, GET, and/or APPEND command(s) to/from the host, and may perform (or execute) one or more operations corresponding to the command(s).

The interface 500 used to connect the data storage device 100 with the host may take one of many different forms, including as examples, a Universal Serial Bus (USB) interface, a Small Computer System Interface (SCSI), a Peripheral Component Interconnect-Express (PCI-E) interface, an Advanced Technology Attachment (ATA) interface, a Parallel ATA (PATA) interface, a Serial ATA (SATA) interface, a Serial Attached SCSI (SAS) interface, and/or a Non-Volatile Memory express (NVMe) interface.

In certain embodiments the data storage device 100 may be configured and/or operated as a Solid State Drive (SSD). Alternatively, the data storage device 100 may be configured as a memory card, such as a Personal Computer Memory Card International Association (PCMCIA) card, a Compact Flash (CF) card, a Smart Media (SM) card, a memory stick, a Multi-Media Card (MMC), a Reduced Size MMC (RS-MMC), a MMCmicro card, a Secure Digital (SD) card, a miniSD card, a microSD card, a Secure Digital High Capacity (SDHC) card, and/or a Universal Flash Storage (UFS). However, in the description that follows, it is assumed that the data storage device 100 is an SSD.

Figure 2:
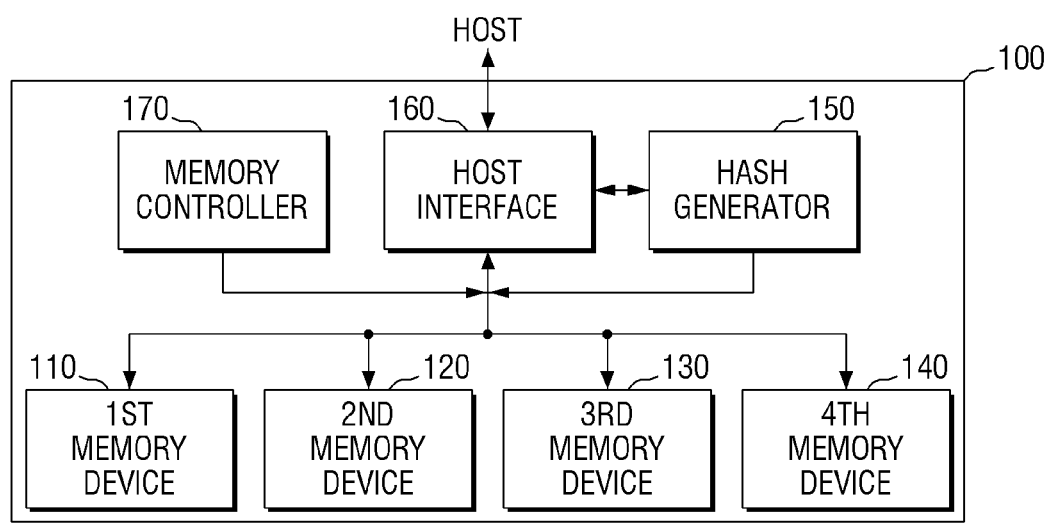
FIG. 2 is a block diagram of the data storage device according to some embodiments of the present disclosure.

FIG. 2 is a block diagram further illustrating on one example the data storage device 100 of FIG. 1 according to some embodiments of the present disclosure, where the data storage device 100 includes first, second, third, and fourth memory devices 110, 120, 130, and 140, a hash generator 150, a host interface 160, and a memory controller 170.

The first memory device 110 may be used to store data received from the host, where the first memory device 110 may include, for example, a nonvolatile memory such as a NAND flash memory, a Phase-change Random Access Memory (PRAM), a Resistive Random Access Memory (RRAM), and/or a Magneto-resistive Random Access Memory (MRAM). In this regard, the first memory device 110 may variously be used to store data on a semi-permanent basis using a phase-change material, a ferroelectric material, a resistive material, and/or a Magnetic Tunnel Junction (MTJ) material as constituent storage element(s).

At least one of the second, third, and fourth memory devices 120, 130, and 140 may similarly configured and used to store data received from the host as memory device 110 described above.

The data storage device 100 shown in FIG. 2 is a selected example of many different data storage devices that may be used in various embodiments. For example, the choice of four memory devices (i.e., first, second, third and fourth memory devices, 110, 120, 130 and 140) is arbitrary and the data storage device 100 may include any reasonable number of memory devices, as physically provided and/or logically defined with the data storage device 100. However, in the description that follows, it is assumed that the data storage device 100 includes the four memory devices described in relation to FIG. 2.

According to various embodiments, the first, second, third, and fourth memory devices 110, 120, 130, and 140 of the data storage device 100 may be configured as a Redundant Array of Independent Disks (RAID), such that each one of the first, second, and third memory devices 110, 120, and 130 is used to store data received from the host, while the fourth memory device 140 is used to store the parity data (or "parities") derived from the data stored in the first, second, and third memory devices 110, 120, and 130.

The hash generator 150 may be used to perform hashing operations on data stored by the data storage device 100 to generate hashing result ("hash data" or "hashes"). Here, the hash generator 150 may perform, for example, one or more cryptographic hash function(s) such as MD5 or SHA, and/or one or more non-cryptographic hash function(s) such as CRC. Thus, the hash generator 150 may be understood as generating hashes from data received via the host interface 160 and/or one or more of the plurality of memory devices using a cryptographic hash function and/or a non-cryptographic hash function. As will be described in some additional detail hereafter, some hashes generated by the hash generator 150 may be used as keys for parity values stored in the fourth memory device 140

Although not specifically illustrated in FIG. 2, the hash generator 150 may include an internal memory, such as a Dynamic Random Access Memory (DRAM). The hash generator 150 may generate hashes from the data stored in at least one of the first, second, third, and fourth memory devices 110, 120, 130, and 140 and may temporarily store the generated hashes in the internal memory.

In FIG. 2, the memory controller 170 may be used to control the receipt of data from the host via the host interface 160, as well as the generation of values corresponding to the data stored in the first, second, and third memory devices 110, 120, and 130 and keys for identifying the values. Hence, the memory controller 170 may be used to control the generation of parities that may be subsequently used to detect error(s) in the stored data. In this regard, the memory controller 170 may also be used to manage key-value mapping information indicating respective correspondence between values and keys.

According to embodiments of the subject disclosure, the data storage device 100 need not store data in the first, second, third, and fourth memory devices 110, 120, 130, and 140 in accordance with Logical Block Addresses (LBAs). Instead, the data storage device 100 operates as a key-value store using the values corresponding to the data stored in the first, second, third, and fourth memory devices 110, 120, 130, and 140 and keys identifying respective values. Read and write operations directed to data stored by the data storage device 100 may operate in accordance with a key-value approach that will be described hereafter in some additional detail.

Figure 3:
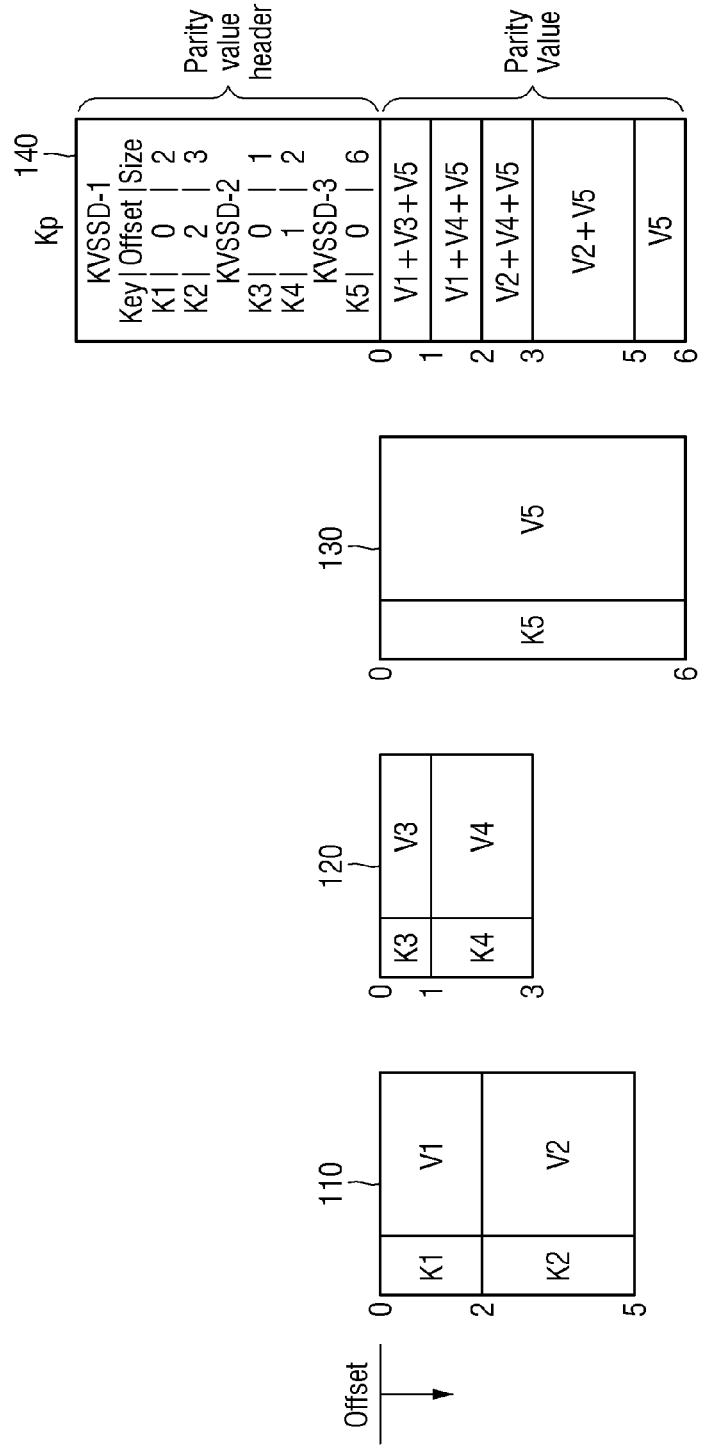
FIG. 3 is a conceptual diagram illustrating operation of the data storage device according to some embodiments of the present disclosure.

FIG. 3 is a conceptual diagram illustrating operation of the data storage device 100 according to some embodiments of the present disclosure.

Referring to FIG. 3, it is assumed for the following explanation that; the first memory device 110 stores first and second values V1 and V2, the second memory device 120 stores third and fourth values V3 and V4, and the third memory device 130 stores a fifth value V5. The fourth memory device 140 stores parity data associated with (or derived from) the first through fifth values V1 through V5 stored in the first, second, and third memory devices 110, 120, and 130. In addition to the foregoing values (V1 through V5, inclusive), the first, second, third, and fourth memory devices 110, 120, 130, and 140 store keys respectively corresponding to the values. As noted above, the term "value" denotes data stored in a memory device, while the term "key" denotes indexing data used to identify a corresponding value. As suggested by the illustration of FIG. 2, each value may have a unique size. Further, each value may be associated with an "offset" (e.g., a defined starting address at which each value is stored).

With reference to FIG. 3, the first memory device 110 store a first key K1 mapped to the first value V1, and a second key K2 mapped to the second value V2. Here, the first value V1 is assumed to have an arbitrary size of 2 and an offset of 0, as stored in the first memory device 110. It is further assumed that the second value V2 is stored in the first memory device 110 immediately following the first value V1. Thus, assuming that the second value V2 has a size of 3, it is stored beginning at with an offset of 2 and ending at an address corresponding to an offset of 5.

Consistent with the foregoing nomenclature, the second memory device 120 stores a third key K3 mapped to the third value V3 of size 1, and a fourth key K4 mapped to the fourth value V4 of size 2. The third memory device 130 stores a fifth key K5 mapped to the fifth value V5 of size 6.

Given the working assumptions set forth above in relation to the first, second and third memory devices 110, 120 and 130, the fourth memory device 140 stores "parity values" respectively corresponding to the values stored in the first, second, and third devices 110, 120, and 130 (e.g., respective parity values corresponding to the first through fifth values V1 through V5). In this regard, certain embodiments of the fourth memory device 140 may include a parity value region in which parity values are stored, and a parity value header region in which information regarding the parity values, i.e., a "parity value header", is stored.

For example, the parity value header region may be used to store size and offset information for each one of the first through fifth keys K1 through K5 and/or the first through fifth values V1 through V5, as well as mapping information for the first through fifth keys K1 through K5 and/or the first through fifth values V1 through V5.

Further in this regard, a key corresponding to parity data stored in the fourth memory 140 may be referred to as a "parity key" or Kp.

FIG. 4 is another conceptual diagram further illustrating in one approach how data may be stored in the plurality of memory devices included in the data storage device 100 according to some embodiments of the present disclosure.

Continuing with the assumptions set forth in relation to FIG. 3 and additionally referring to FIG. 4, the first memory device 110 stores the first key K1 and the first value V1 in a first region 111 and the second key K2 and the second value V2 in a second region 112. Here, the data storage device 100 may store the first value V1 in the first memory device 110, and the first key K1 as well as address(es) (e.g., a starting address) for a memory region storing the first value V1 in a key-value mapping table. Specifically, the memory controller 170 may manage the contents of the key-value mapping table indicating correspondence between the first value V1 and the first key K1.

In this regard, the key-value mapping table may be managed by the memory controller 170 such that the first key K1 corresponds with the address of the memory region where the first value V1 is stored. Similarly, the data storage device 100 may store the correspondence between the second value V2 and the second key K2 in the key-value mapping table. Accordingly, the key-value mapping table may be managed such that the second key K2 corresponds with the address of a memory region where the second value V2 is stored.

As suggested by the illustration of FIG. 4, the first and second values V1 and V2 need not be stored successively (or continuously) in the first memory device 110. In this manner, the fourth memory device 140 may store parity value header information correctly defining successive offsets for the first and second values V1 and V2, whereas the actual (physical) addresses in the first memory device 110 at which the first and second values V1 and V2 are actually stored need not be successive.

The second memory device 120 storing the third key K3 and the third value V3 in a third region 121, and the fourth key K4 and the fourth value V4 in a fourth region 122, as well as the third memory device 130 storing the fifth key K5 and the fifth value V5 in a fifth region 131 may be similarly controlled.

As a result, the fourth memory device 140 may store a parity key Kp and a parity value Vp in a sixth region 141. The parity key Kp is mapped to the parity value Vp, and the key-value mapping table may be managed such that the parity key Kp corresponds with the address of a memory region where data corresponding to the parity value Vp is stored.

Referring back to FIG. 3, the fourth memory device 140 may include the parity value region, such that the fourth memory device 140 may store parity values associated with the first through fifth values V1 through V5 in the parity value region. In this regard, the data storage device 100 may define a predetermined rule controlling the use of the parity value region, such that the storing of the parity values for the first through fifth values V1 through V5 is controlled by the predetermined rule.

The data storage device 100 may generate the parity values of data having the same offset, among the data stored in the first, second, and third memory devices 110, 120, and 130, and may store the generated parity values at an address of the fourth memory device 140 corresponding to the particular offset.

For example, data having an offset of 0 among the data stored in the first, second, and third memory devices 110, 120, and 130 described above includes the first, third, and fifth values V1, V3, and V5. Thus, the parity values of the first, third, and fifth values V1, V3, and V5 may be stored at an address of the fourth memory device 140 corresponding to the offset of 0.

In some embodiments, data obtained by performing an XOR operation on the data stored in the first, second, and third memory devices 110, 120, and 130 may be stored in the fourth memory device 140, but the present disclosure is not limited thereto. For example, data obtained by performing an XOR operation on data corresponding to the first, third, and fifth values V1, V3, and V5, i.e., (V1+V3+V5), may be stored at the address of the fourth memory device 140 corresponding to the offset of 0.

Similarly, data obtained by performing an XOR operation on data corresponding to the first, fourth, and fifth values V1, V4, and V5, i.e., (V1+V4+V5), may be stored at an address of the fourth memory device 140 corresponding to an offset of 1.

Operation of the data storage device 100 will be further described assuming the foregoing rules for the data stored in the first, second, third, and fourth memory devices 110, 120, 130, and 140.

Figure 5A:
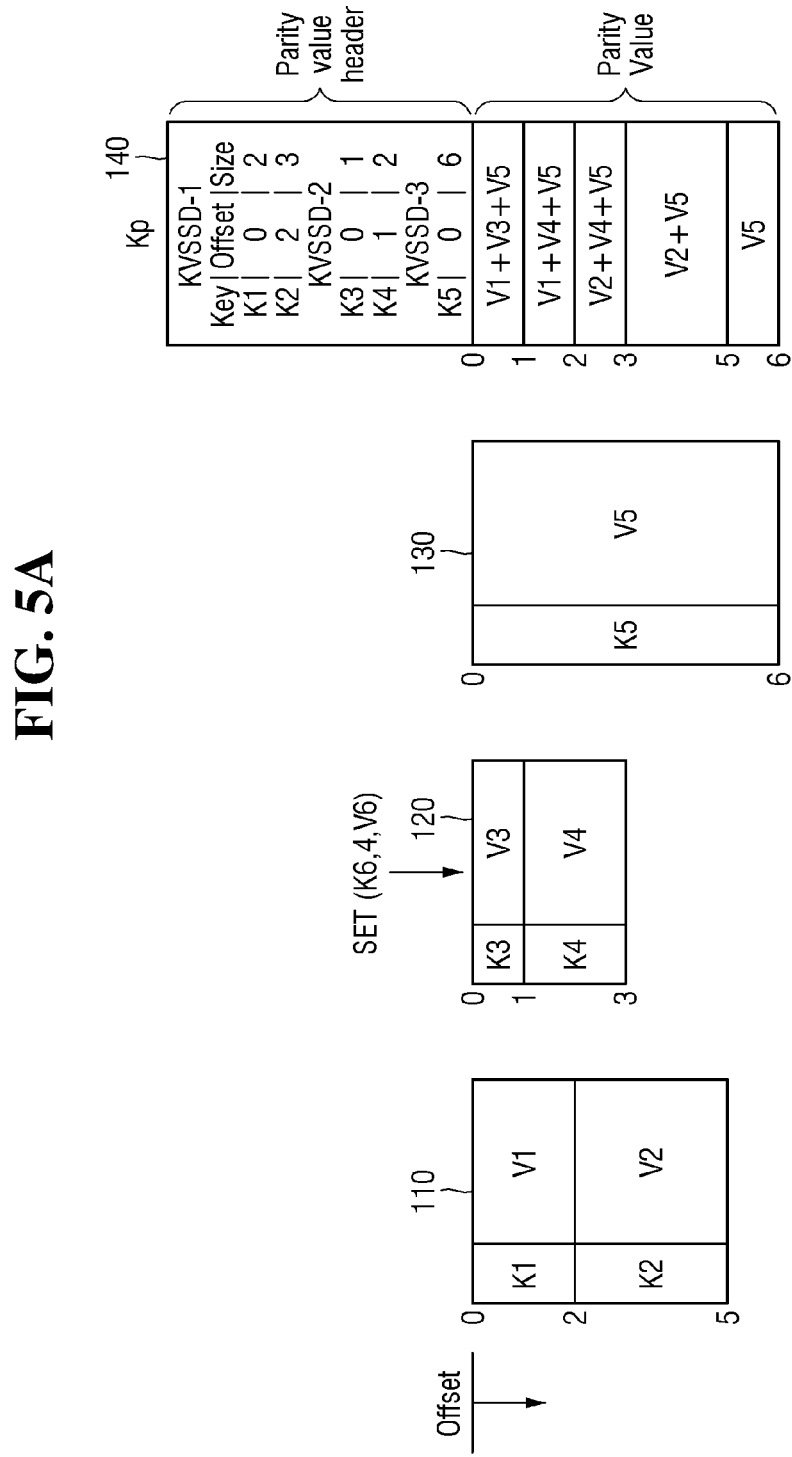
FIGS. 5A, 5B and 5C are respective conceptual diagrams illustrating operation of the data storage device according to some embodiments of the present disclosure.
Figure 5B:
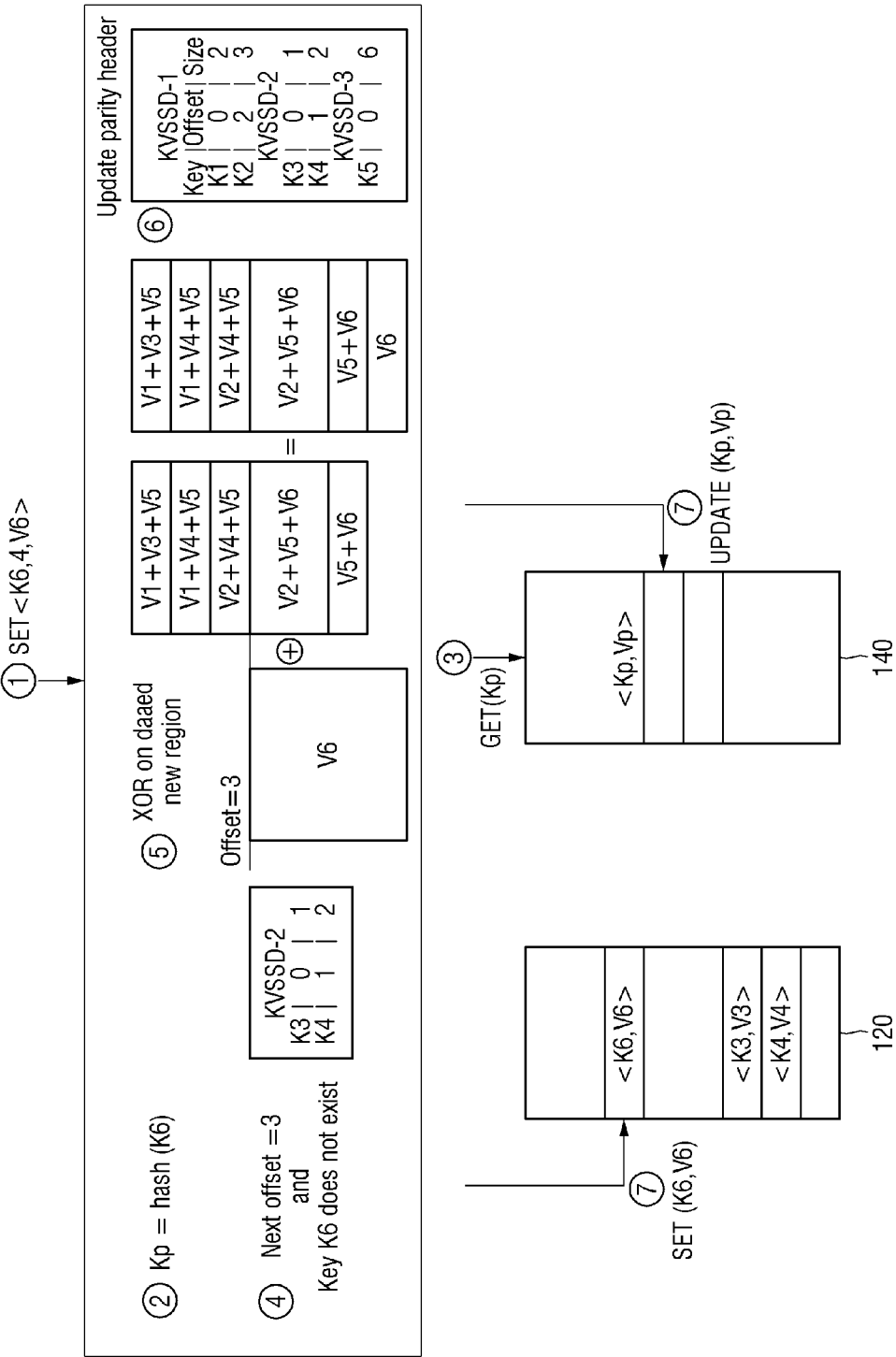
Figure 5C:
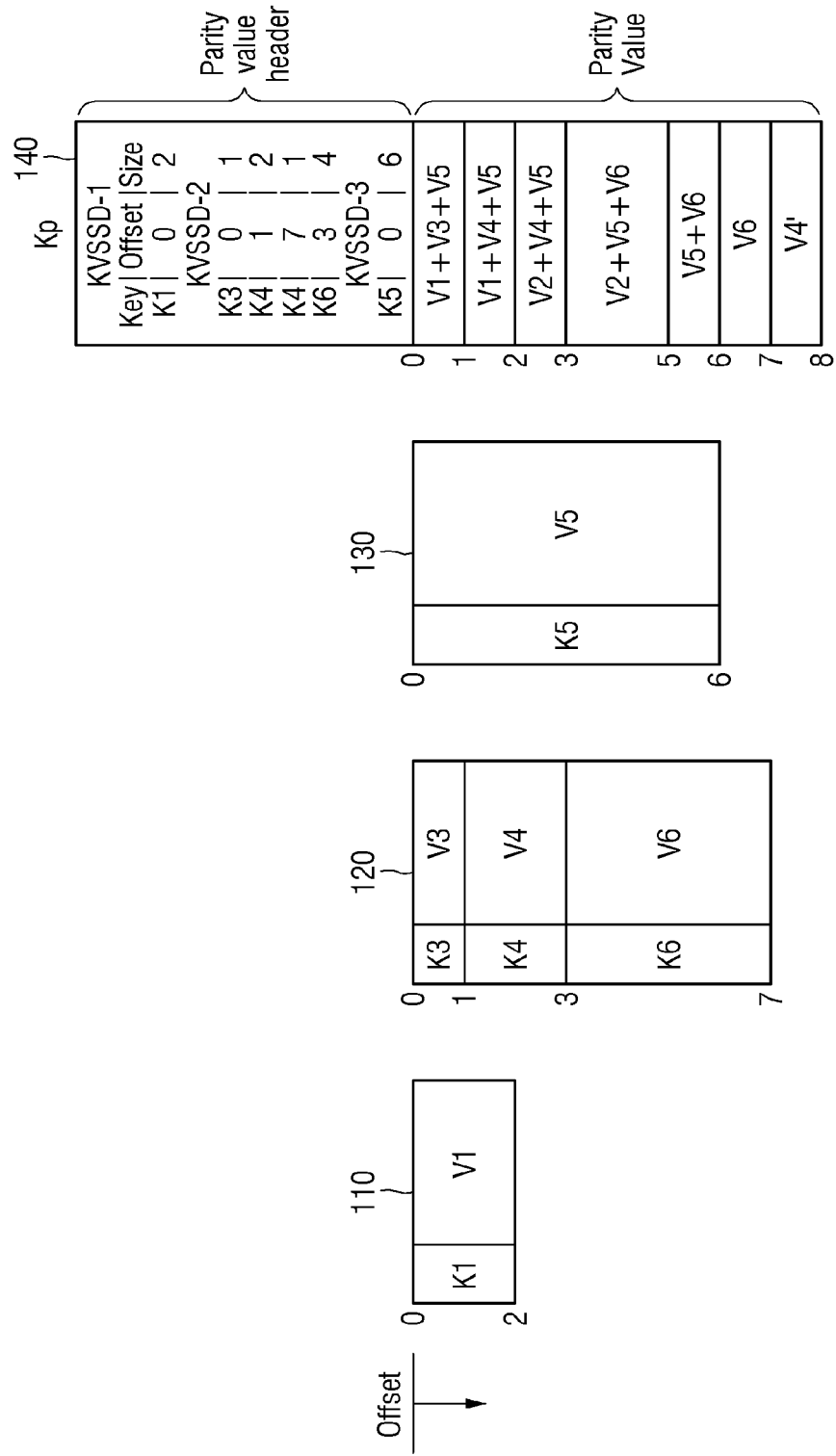

FIGS. 5A, 5B and 5C are respective conceptual diagrams illustrating the execution of a SET operation within the data storage device 100 according to some embodiments of the present disclosure.

Referring to FIGS. 2, 5A and 5B, a SET command together with a sixth key K6, and a sixth value V6 associated with size information for the sixth value V6 are received by the data storage device 100 from the host via the host interface 160. It is assumed that the host designates a memory device among the first second and third memory devices 110, 120 and 130 in which the sixth key K6 and the sixth value V6 are to be stored (e.g., the second memory device 120).

Hence, the sixth key K6 is provided to the hash generator 150 via the host interface 160 and the hash generator generates a hash of the sixth key K6. That is, the hash generator 150 may generate a hash of the sixth key K6 by inputting the sixth key K6 to a hash function and outputting a resulting hash. The hash of the sixth key K6 may then be provided to the fourth memory device 140 as a parity key Kp.

The fourth memory device 140 is provided with the parity key Kp (Get(Kp)). The data storage device 100 may update the key-value mapping table using the parity key Kp and an address at which a parity value Vp to be updated by the SET command is to be stored.

The data storage device 100 may search the second memory device 120 to determine whether the sixth key K6 exists in the second memory device 120. If the sixth key K6 is not stored in the second memory device 120, the data storage device 100 may generate an offset of an address at which the sixth value V6 is to be stored by searching the second memory device 120. Since the fourth value V4 with a size of 2 is stored starting from an offset of 1, the sixth value V6 may be stored starting from an offset of 3.

Thereafter, the data storage device 100 generates parity values using the sixth value V6, which is newly added. Since the sixth value V6 is stored starting from an offset of 3, the data storage device 100 generates and stores new parity values, starting from an offset of 3. New parity values, i.e., "V2+V5+V6", "V5+V6", and "V6", are generated using the existing parity values, i.e., "V2+V5" and "V5", and the sixth value V6, and the generated new parity values are stored in the parity value region of the fourth memory device 140.

Thereafter, the data storage device 100 updates information in the parity value header region regarding the second memory device 120 where the sixth value V6 is stored. The data storage device 100 may record, in the parity value header region, a parity value Vp and a parity key Kp into which offset information and size information of the sixth value V6 are updated. In this manner, the writing of the sixth key K6 and the sixth value V6 to the second memory device 120 is complete.

FIG. 5C shows that the sixth key K6 and the sixth value V6 are newly stored in the second memory device 120, and also shows that information stored in the parity value header region and the parity value region of the fourth memory device 140 is updated accordingly.

Figure 6:
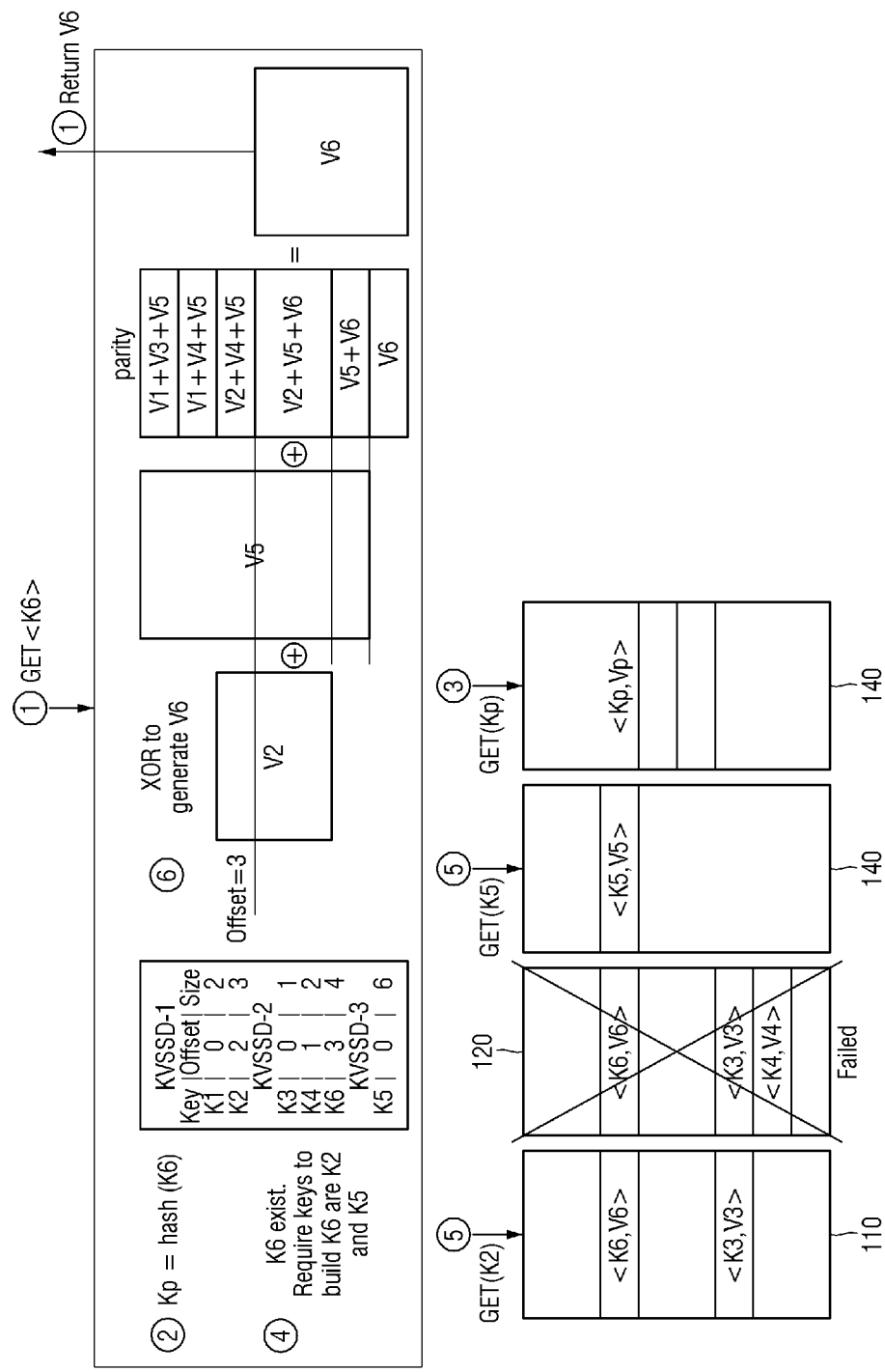
FIG. 6 is a conceptual diagram illustrating a GET operation of the data storage device according to some embodiments of the present disclosure when a fail occurs in a second memory device.

FIG. 6 is still another conceptual diagram illustrating the execution of an operation by the data storage device 100 according to some embodiments of the present disclosure, further assuming that a FAIL occurs in relation to the second memory device 120.

In the illustrated example of FIG. 6, a GET command directed to the sixth key K6 is communicated from the host to the data storage device 100. However, in response to this GET command a fail occurs with respect to the second memory device 120. It is assumed that the occurrence of a fail in the second memory device 120 is already known to the data storage device 100.

The data storage device 100 is provided with the sixth key K6 and a GET command from the host, and generates a parity key Kp using the hash of the sixth key K6. These steps are almost the same as their respective counterparts performed in response to a SET command described above. Thereafter, the data storage device 100 searches the parity value header stored in the fourth memory device 140 to find where the sixth key K6 and the sixth value V6 are stored, using the parity key Kp. Since information regarding the sixth key K6 is stored in the parity header, but a fail has occurred in the second memory device 100 where the sixth key K6 is actually stored, the sixth value V6 needs to be rebuilt using the parity values stored in the fourth memory device 140.

The data storage device 100 attempts to rebuild the sixth value V6 using the offset of the sixth value V6. Information indicating that the offset and the size of the sixth value V6 are 3 and 4, respectively, is stored in the parity value header. Thus, the data storage device 100 rebuilds the sixth value V6 in four stages using the data stored in the first and third memory devices 110 and 130 and using the parity values stored in the fourth memory device 140.

Once the rebuild of the sixth value V6 is complete, the data storage device 100 provides the sixth value V6 to the host via the host interface 160.

Figure 7:
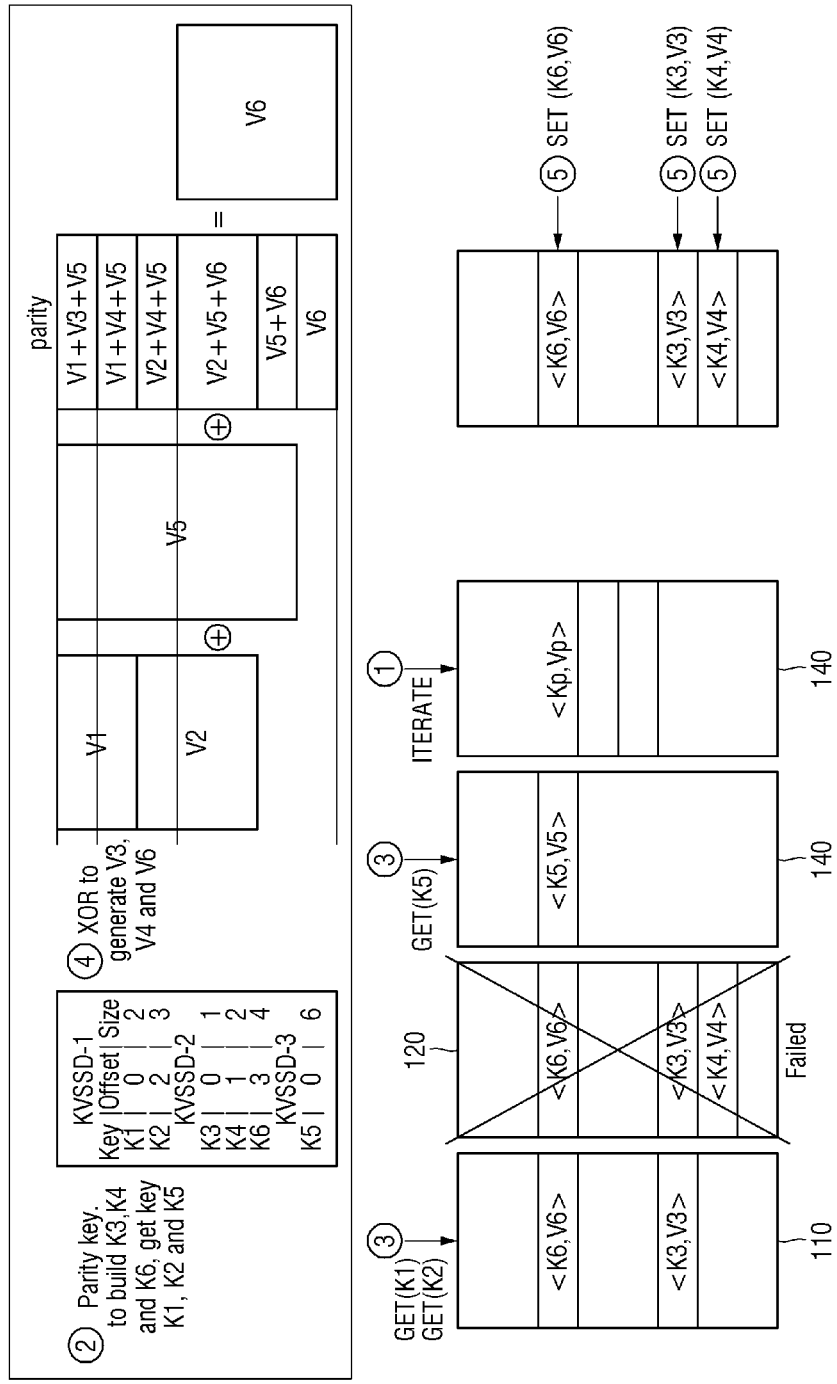
FIG. 7 is a conceptual diagram illustrating a rebuild operation of the data storage device according to some embodiments of the present disclosure.

FIG. 7 is a still another conceptual diagram further illustrating in one example the rebuild operation performed by the data storage device 100 according to some embodiments of the present disclosure.

Referring to FIG. 7, an ITERATE command is provided to the fourth memory device 140. The ITERATE command may be provided by the host or may be internally generated by the data storage device 100 during the rebuild process.

Thereafter, the parity value header is searched to restore the third, fourth, and sixth keys K3, K4, and K6 and the third, fourth, and sixth values V3, V4, and V6, stored in the second memory device 120.

As a result of the search of the parity value header, the first, second, and fifth keys K1, K2, and K5 are obtained. Since offset information and size information of the first, second, and fifth values V1, V2, and V6 is stored in the parity value header, the data storage device 100 may rebuild the data stored in the second memory device 120 sequentially starting from an offset of 0. Once the rebuild of the data stored in the second memory device 120 is complete, data rebuilt in the second memory device 120 can be recorded using a SET command. Since the fourth memory device 140 where the parity value header is stored is normal, key or parity value updates are not needed.

Figure 8B:
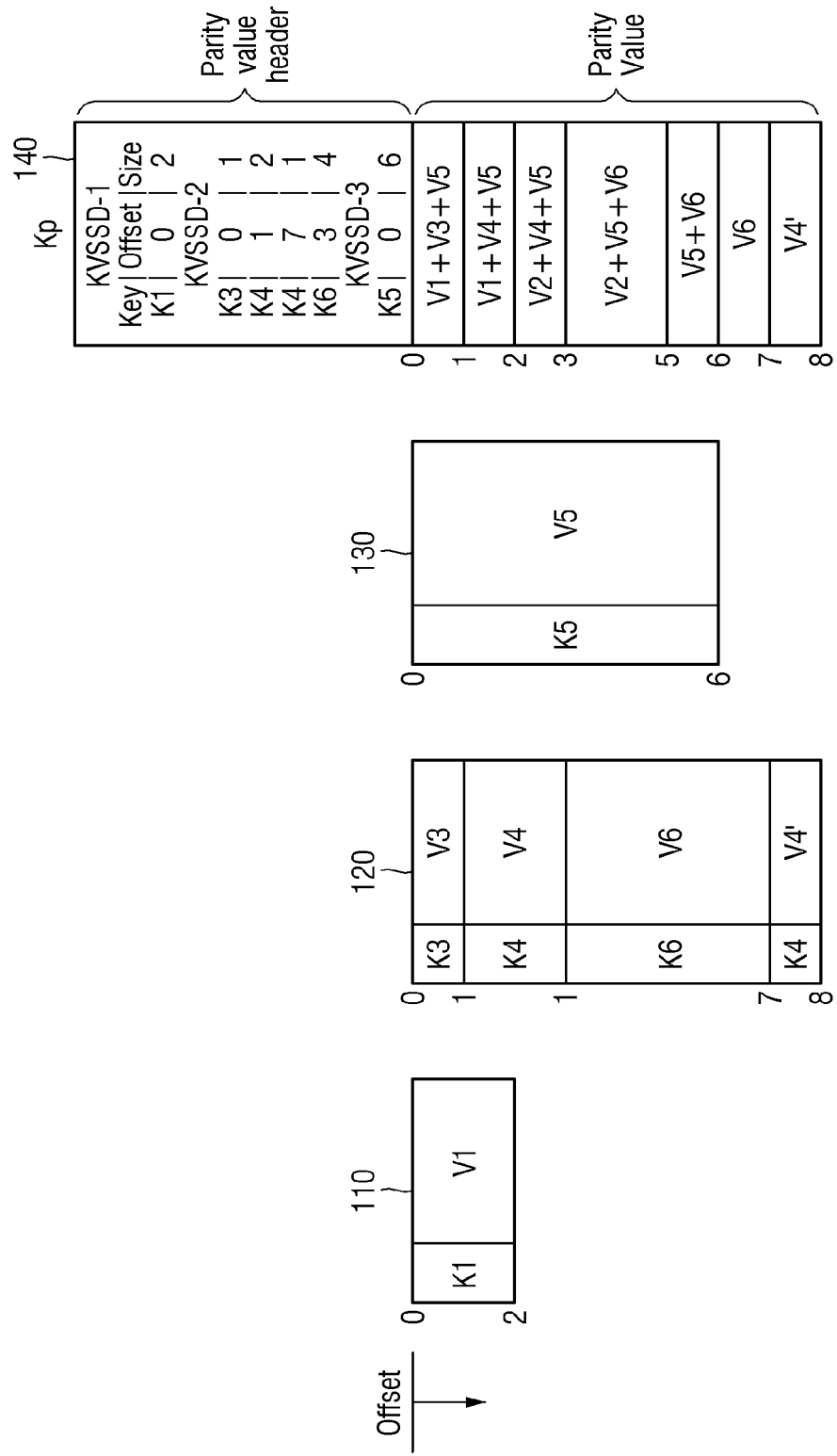

FIGS. 8A and 8B are respective conceptual diagram illustrating a delete operation executed by the data storage device 100 according to some embodiments of the present disclosure.

Referring to FIG. 8A, a DELETE command and the second key K2 are provided to the data storage device 100 from the host. The hash generator 150 may generate a parity key Kp using the second key K2. The data storage device 100 searches the parity value header for information regarding the second key K2 and the second value V2 using the generated parity key Kp.

The data storage device 100 performs an XOR operation on the second value V2 and existing parity values to remove the second value V2 from the first memory device 110. Since offset information and size information of the second value V2 is stored in the parity value header, the data storage device 100 may generate new parity values, i.e., "V4+V5" and "V5+V6", by removing the second value V2 from the existing parity values with reference to the offset information and the size information of the second value V2. The generation of the new parity values may be performed in the internal memory of the data storage device 100.

The information regarding the second key K2 is removed from the parity value header, and the second key K2 and the second value V2 are removed from the first memory device 110. The data storage device 100 may update, in the fourth memory device 140, information regarding a parity key Kp and a parity value Vp from which the second key K2 and the second value V2 are removed.

FIG. 8B shows that the second key K2 and the second value V2 are removed from the first memory device 110, and also shows that the information regarding the second value V2 is removed from the parity value header and the parity value region of the fourth memory device 140.

Figure 9A:
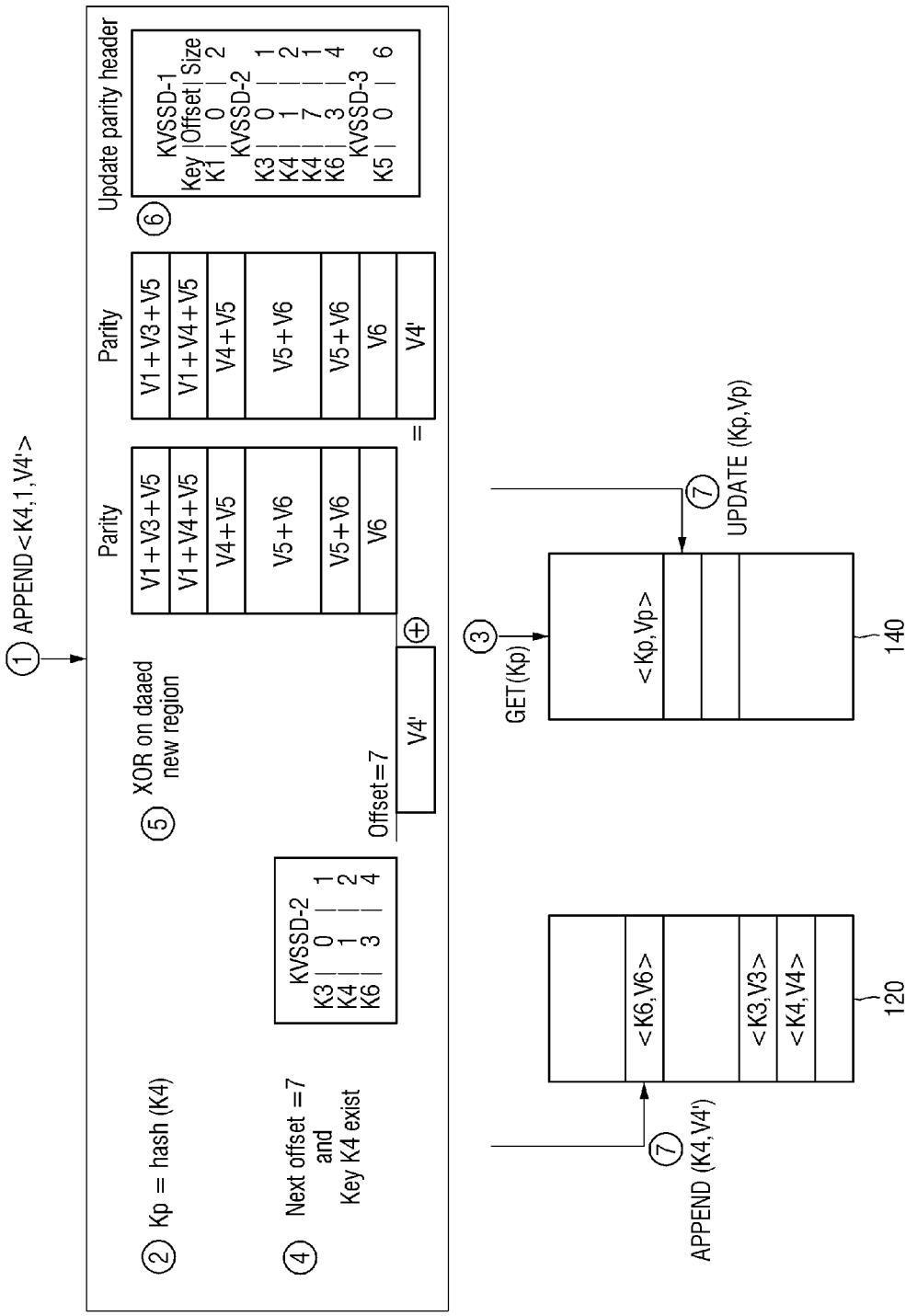
FIGS. 9A and 9B are conceptual diagrams illustrating an APPEND operation of the data storage device according to some embodiments of the present disclosure.
Figure 9B:
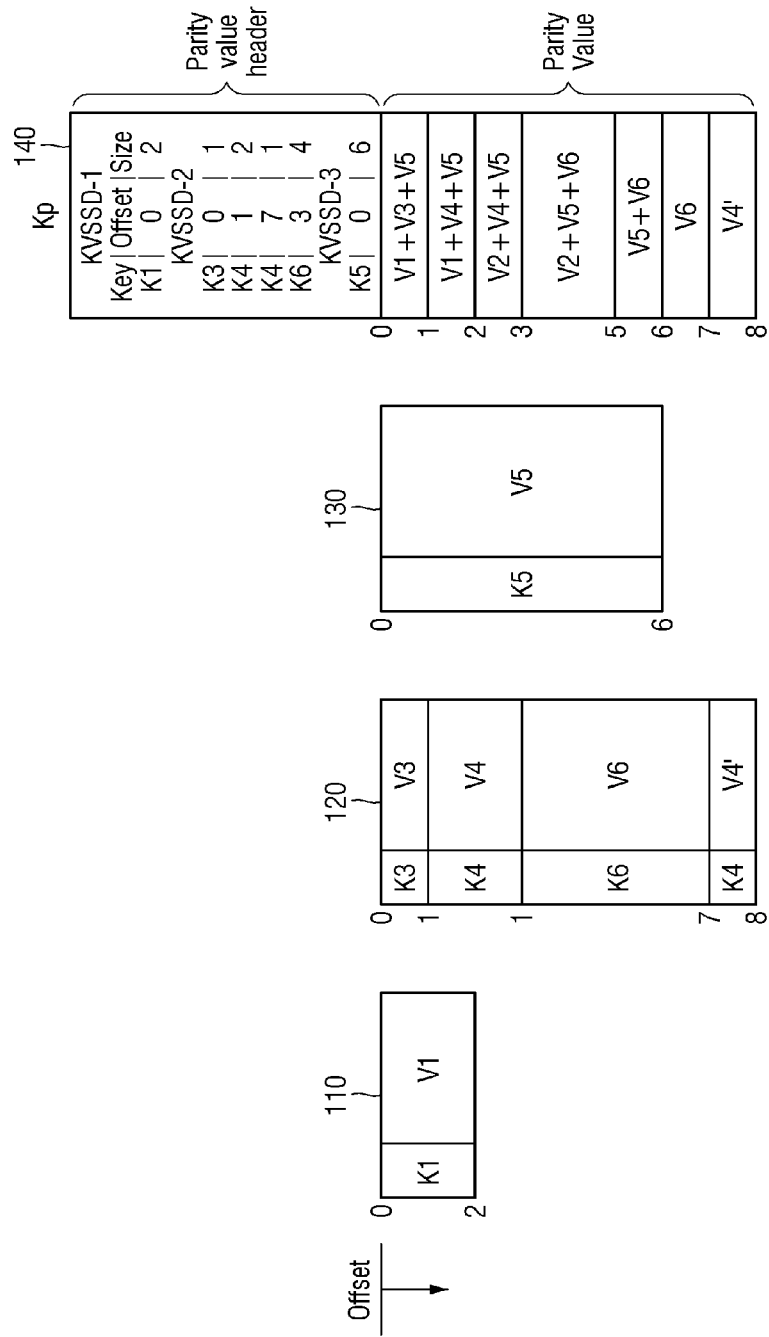

FIGS. 9A and 9B are respective conceptual diagrams illustrating the execution of an APPEND operation by the data storage device 100 according to some embodiments of the present disclosure.

Referring to FIG. 9A, an APPEND command, the fourth key K4, the fourth value V4, and size information 1 of data to be added to the fourth value V4 are provided to the data storage device 100 from the host.

The memory controller 170 is provided with the fourth key K4 from the host interface 160, generates a hash of the fourth key K4 using the hash generator 150, and designates the generated hash as a parity key Kp. The parity key Kp is provided to the fourth memory device 140.

The fourth memory device 140 is provided with the parity key Kp (Get(Kp)). The data storage device 100 may update the key-value mapping table using the parity key Kp and an address at which a parity value Vp to be updated by a SET command is to be stored.

The data storage device 100 may search the parity value header to determine whether the fourth key K4 exists in the second memory device 120. As illustrated in FIG. 9A, since the fourth key K4 is stored in the second memory device 120, the data storage device 100 searches for the last offset in the second memory device 120 where data is stored. Since the sixth key K6 is stored in the second memory device 120, particularly, in a memory region starting from an offset of 3 and having a size of 4, a fourth key K4' may be recorded starting from an offset of 7.

Parity values into which information regarding a fourth value V4' to be recorded by a SET command is reflected are generated. Since the offset of 7 does not exist in the first and third memory devices 110 and 130, only the information regarding the fourth value V4' may be added as a new parity.

Thereafter, the data storage device 100 may update the parity value header by reflecting information to be recorded in the second memory device 120, and may store the updated parity key Kp and the updated parity value Vp in the fourth memory device 140. Similarly, the data storage device 100 stores the fourth value V4' in the second memory device 140. Also, the data storage device 10 may update address information of the fourth key K4' and the fourth value V4' in the key-value mapping table.

Although some embodiments of the present disclosure have been disclosed for illustrative purposes, those skilled in the art will appreciate that various modifications, additions and substitutions are possible, without departing from the scope and spirit of the embodiments of disclosure as disclosed in the accompanying claims.

What is claimed is:

1. A storage device, comprising:
    a plurality of memory devices; and
    a memory controller that receives, from a host, values corresponding to data stored in the plurality of memory devices and keys for identifying the values, that generates parities for inspecting the data for any errors based on the values, and that manages key-value mapping information regarding a correspondence between the values and the keys,
    wherein the plurality of memory devices include a first memory device and a second memory device, which store the values and the keys, and a third memory device, which stores parity values calculated from the values and a parity value header for managing the parity values;
    the first memory device stores a first value and a first key for identifying the first value;
    the second memory device stores a second value and a second key for identifying the second value; and
    the third memory device stores an offset of an address of the first memory device where the first value is stored, a size of the first value, an offset of an address of the second memory device where the second value is stored, and a size of the second value in the parity value header.

2. The storage device of claim 1, wherein
    the memory controller generates hash values for the first key and the second key, and
    the hash values for the first key and the second key are the same.

3. The storage device of claim 1, wherein the memory controller is provided, from the host, with a set command, a first value corresponding to data to be recorded by the set command, and a first key for identifying the first value, and stores the first value and the first key in the first memory device.

4. The storage device of claim 3, wherein the memory controller generates a parity key using a hash of the first key provided from the host, generates new parity value using the values stored in the first memory device and the second memory device and the first value provided from the host, and stores the new parity value and the parity key in the first memory device.

5. The storage device of claim 1, wherein the memory controller is provided, from the host, with a delete command, and a first key mapped to data to be deleted, and deletes a first value corresponding to the first key from one of the first memory device and the second memory device.

6. The storage device of claim 5, wherein the memory controller generates a parity key as a generated parity key using a hash of the first key provided from the host, and searches the parity value header stored in the third memory device for information regarding the first key and the first value using the generated parity key, deletes the first value from one of the first memory device and the second memory device, and stores new parity values calculated from the first value and existing parity values.

7. The storage device of claim 1, wherein the memory controller is provided, from the host, with an append command, a first key mapped to a first value to be referenced by the append command, and a second value with which the first value is to be updated, and stores the second value in one of the first memory device and the second memory device.

8. The storage device of claim 7, wherein the memory controller generates a parity key as a generated parity key using a hash of the first key provided from the host, searches the parity value header stored in the third memory device for information regarding the first key and the first value, which corresponds to the first key, using the generated parity key, stores the second value at an address mapped to the first key, and also stores the second value and new parity values calculated from existing parity values in the third memory device.

9. The storage device of claim 1, further comprising:
a hash generator configured to generate a first hash associated with the first key and a second hash associated with the second key.

10. The storage device of claim 9,
wherein at least one of the first hash and the second hash is used as a key for at least one of the parity values stored in the third memory device, and
the parities generated by the memory controller are used to inspect the data for any errors based on the values.

11. A Redundant Array of Independent Disks (RAID) system, comprising:
a host that provides an access command, values, which correspond to data being targeted by the access command, and keys for identifying the values; and
a plurality of storage devices configured as a RAID, that receives the access command from the host, and that accesses data stored therein in response to the access command,
wherein the plurality of storage devices include a first storage device and a second storage device, which store the values and the keys, a third storage device, which stores parity values, calculated from the values stored in the first storage device and the second storage device, and a parity value header for managing the parity values, and a RAID controller, which manages key-value mapping information regarding a correspondence between the values and the keys;
the first storage device stores a first value and a first key for identifying the first value; and
the second storage device stores a second value and a second key for identifying the second value, and
the third storage device stores, in the parity value header, an offset of an address of the first storage device where the first value is stored, a size of the first value, an offset of an address of the second storage device where the second value is stored, and a size of the second value.

12. The RAID system of claim 11, wherein
the plurality of storage devices generate hash values for the first key and the second key, and
the hash values for the first key and the second key are the same.

13. The RAID system of claim 12, wherein the plurality of storage devices include Solid State Drives (SSDs).

14. The RAID system of claim 11, further comprising:
a memory controller that manages a key-value mapping table which stores correspondences between the first value and the first key and the second value and the second key.

15. The RAID system of claim 14, further comprising:
a hash generator that generates at least one hash respectively associated with one of the first key and the second key, and the at least one hash is used to generate at least one of the parity values stored in the third storage device,
wherein the parity values calculated from the values are used for inspecting the data for any errors.

16. A storage device, comprising:
a plurality of first memory devices that store data and a second memory device that stores parities of the data; and
a memory controller that receives, from a host, values corresponding to the data stored in the first memory devices and keys for identifying the values, that generates parities for inspecting the data for any errors based on the values, and that manages key-value mapping information regarding a correspondence between the values and the keys,
wherein the memory controller calculates the parities from values mapped to offsets of predetermined addresses in the first memory devices and stores the parities in the second memory device;
one of the first memory devices stores a first value and a first key for identifying the first value and another of the first memory devices stores a second value and a second key for identifying the second value; and
the second memory device stores an offset of an address of the one of the first memory devices where the first value is stored, a size of the first value, an offset of an address of the another of the first memory devices where the second value is stored, and a size of the second value in a parity value header.

17. The storage device of claim 16, wherein
the plurality of the first memory devices generate hash values for the first key and the second key, and
the hash values for the first key and the second key are the same.

18. The storage device of claim 16, wherein the plurality of the first memory devices include flash memories.

19. The storage device of claim 16, further comprising:
a hash generator configured to generate a hash for each of the first key and the second key.

20. The storage device of claim 19, wherein at least one hash is used as a key for at least one of the parities stored in the second memory device.

* * * * *